Dec. 9, 1930.  G. P. LUCIUS  1,784,738
COMBINATION PLOW
Filed March 8, 1930  5 Sheets-Sheet 1
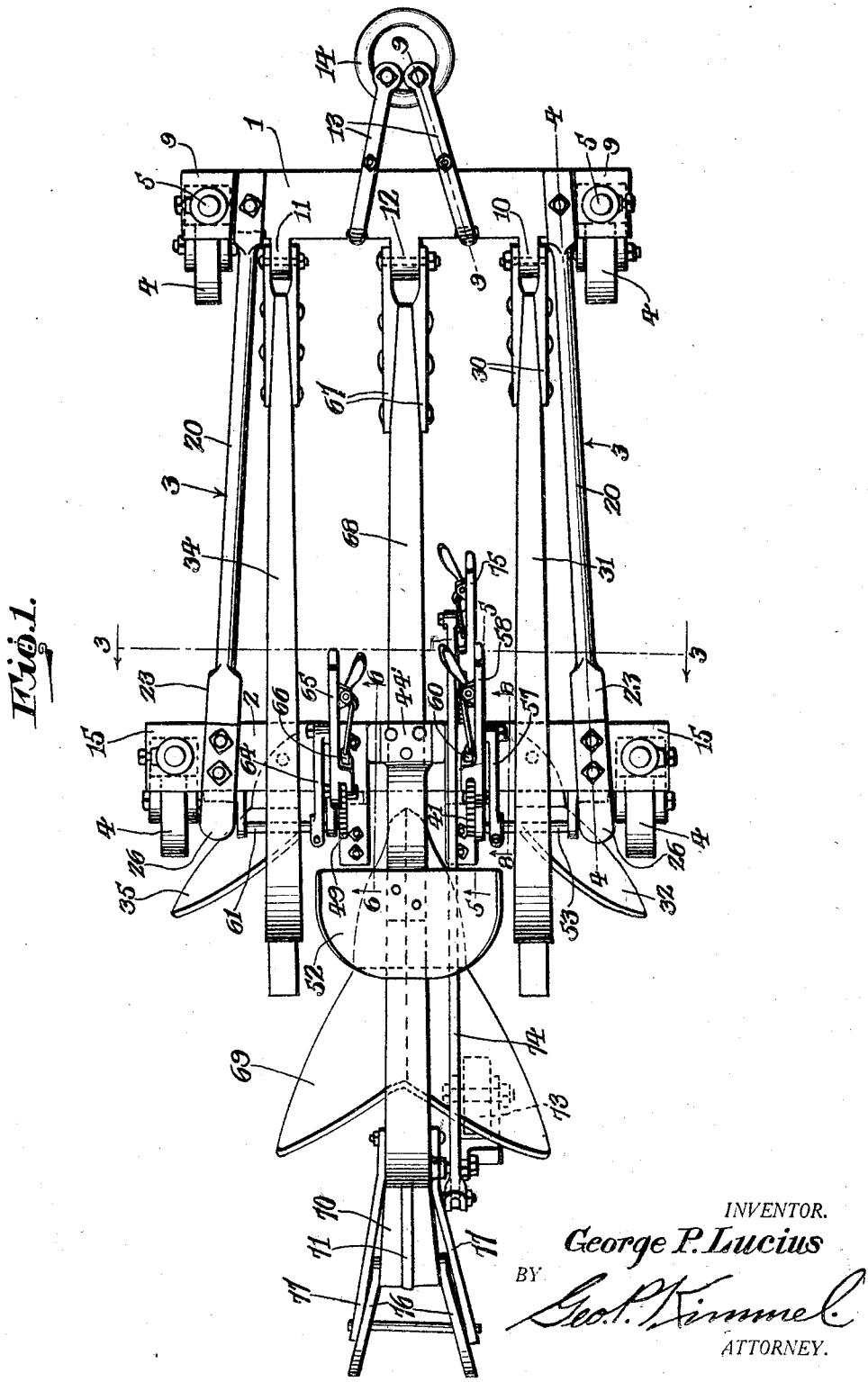
INVENTOR.
George P. Lucius
BY
Geo. P. Kimmel
ATTORNEY.

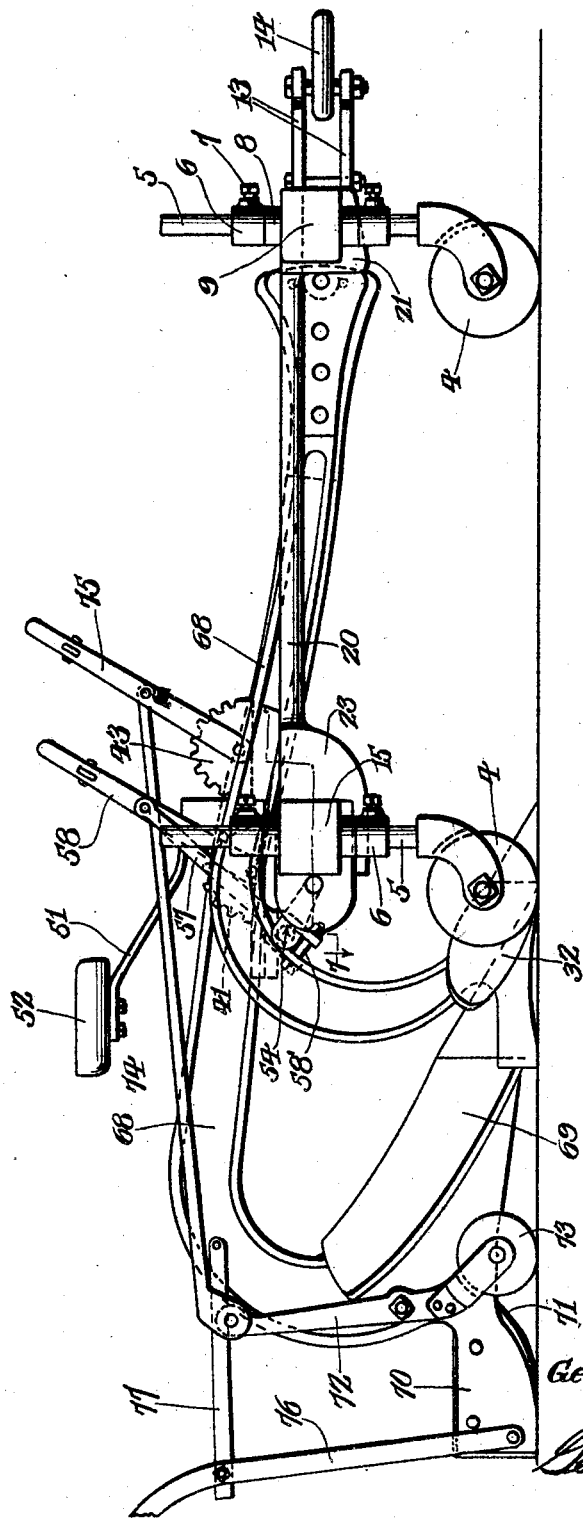

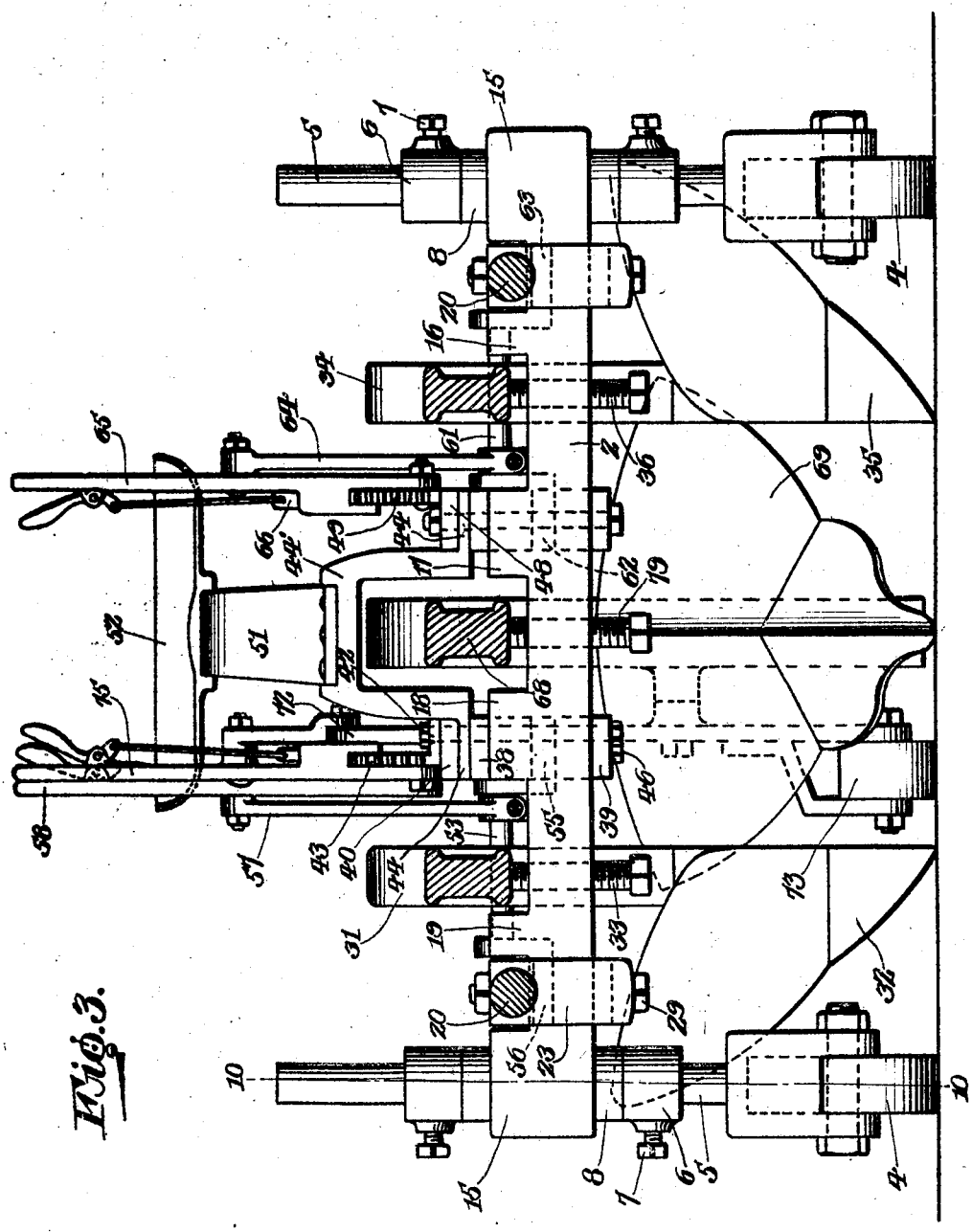

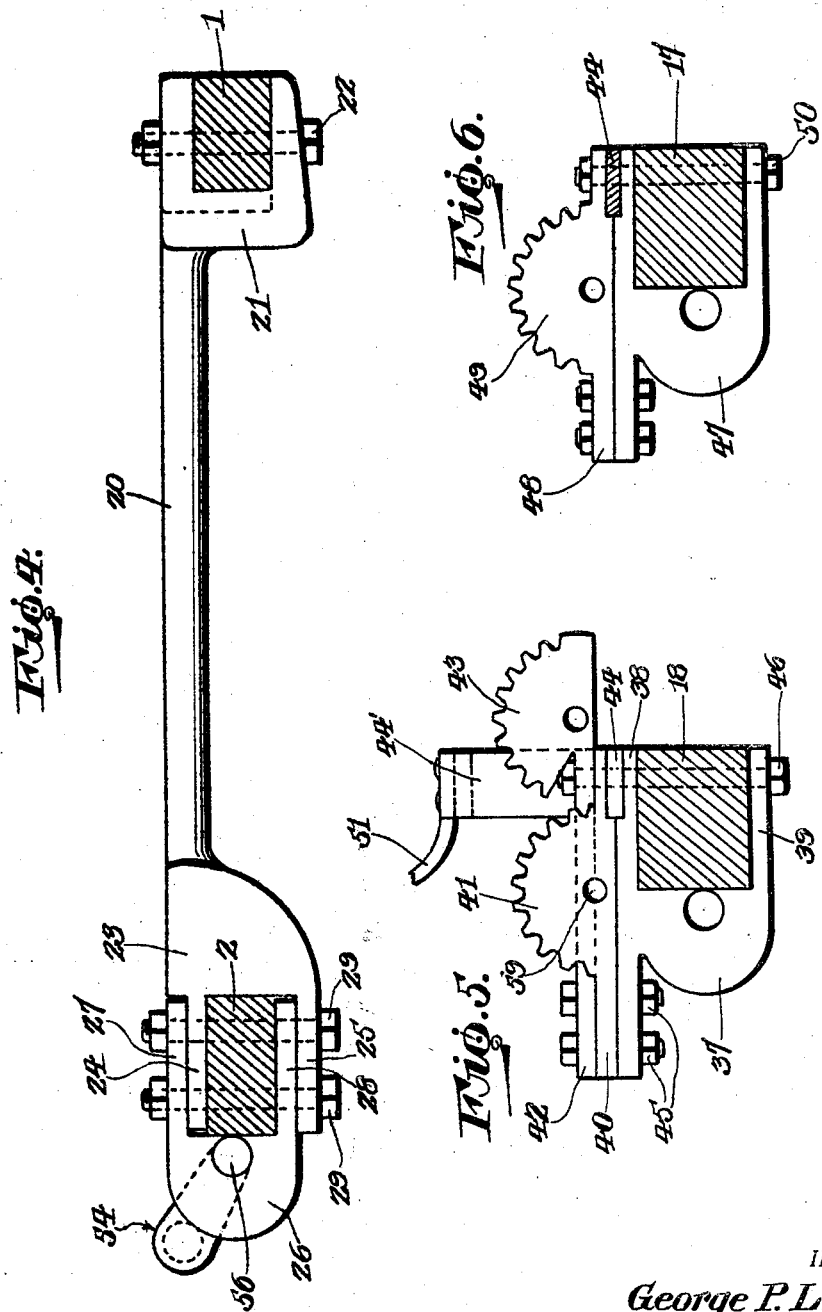

Dec. 9, 1930.  G. P. LUCIUS  1,784,738
COMBINATION PLOW
Filed March 8, 1930     5 Sheets-Sheet 5

INVENTOR.
George P. Lucius
BY
Geo. P. Kimmel
ATTORNEY.

Patented Dec. 9, 1930

1,784,738

UNITED STATES PATENT OFFICE

GEORGE P. LUCIUS, OF RULEVILLE, MISSISSIPPI

COMBINATION PLOW

Application filed March 8, 1930. Serial No. 434,317.

This invention relates to a combination plow particularly adapted for use in breaking ground in a comparatively loose condition, and has for its primary object to provide, in a manner as hereinafter set forth, a combination plow by means of which easily workable ground may be quickly and expeditiously placed in proper condition for seeding or planting.

A further object of the invention is to provide a combination plow for the purpose aforesaid which includes right and left turner members arranged outwardly and forwardly of a buster member, such members being individually adjustable for depth of cut, and further being capable of individual movement to inoperative position.

A further object of the invention is to provide a combination plow of the character aforesaid wherein the plow frame is supported on a plurality of swivelly mounted, vertically adjustable wheels, and which is adapted to be used either as a walking or riding plow.

With the foregoing and other objects in view, the invention consists of the novel construction, combination and arrangement of parts as hereinafter more particularly described, and as illustrated in the accompanying drawings wherein is shown an embodiment of the invention, but it is to be understood that the description and drawings are to be taken as illustrative and that the invention is intended to be limited only by the scope of the claims hereunto appended.

In the accompanying drawings in which like numerals are employed to designate like parts throughout the several views:

Figure 1 is a top plan of a plow in accordance with this invention.

Figure 2 is a side elevation thereof.

Figure 3 is a section taken on the line 3—3 of Figure 1.

Figure 4 is a section taken on the line 4—4 of Figure 1.

Figure 5 is a sectional elevation taken at a point indicated by the line 5—5 of Figure 1.

Figure 6 is a sectional elevation taken at a point indicated by the line 6—6 of Figure 1.

Figure 7:
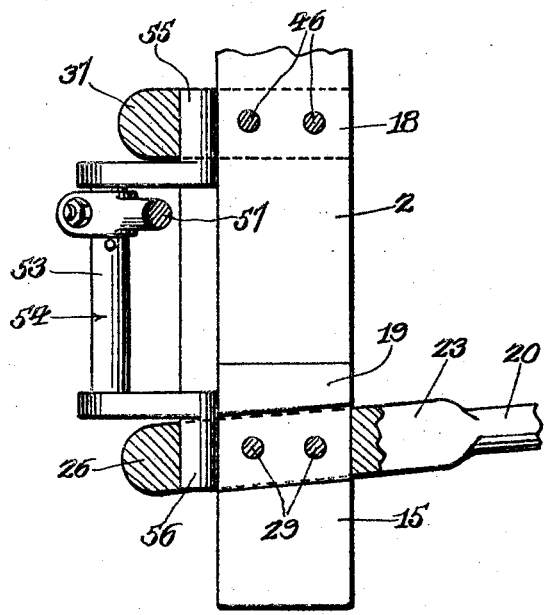
Figure 7 is a sectional plan taken at a point indicated by the line 7—7 of Figure 2.
Figure 8:
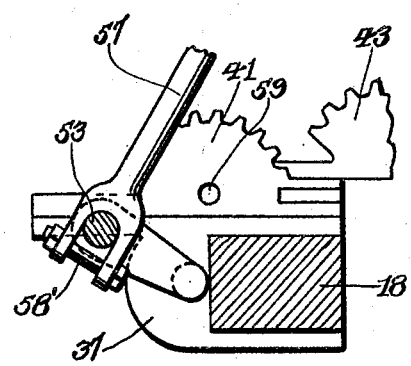
Figure 8 is a section taken on the line 8—8 of Figure 1.
Figure 9:
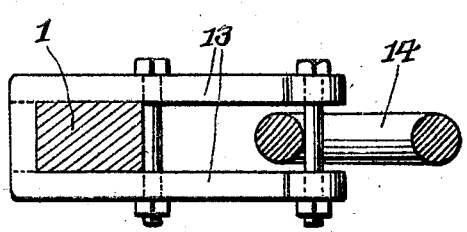
Figure 9 is a section taken on the line 9—9 of Figure 1.
Figure 10:
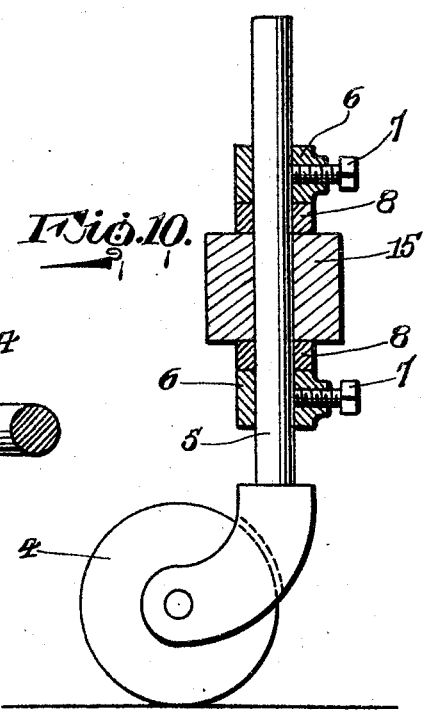
Figure 10 is a section taken on the line 10—10 of Figure 3.

Referring to the drawings in detail, the numerals 1 and 2 respectively designate the front and rear axles of my improved plow, such axles being connected together by means of a pair of side frame members 3, and being supported on a plurality of ground wheels 4. The construction of the wheels is better shown in Figure 10, each wheel being rotatably mounted on a shank 5 which extends vertically through the axle associated with the wheel. Carried by the shank 5 are a pair of collars 6, one of which is disposed on either side of the axle, and each of which is provided with a set screw 7. Interposed between each of the collars 6 and the axle is a suitable washer indicated at 8. By loosening the set screws 7 the shank 5 may be slidably adjusted with respect to the axle through which it extends.

The front axle 1 is substantially in the form of an elongated block formed at its ends with enlarged portions 9 through which the shanks of the forward ground wheels extend. The enlarged portions 9 project upwardly from the upper face of the main body portion of the axle. Projecting rearwardly from the axle 1, in spaced relation to the enlarged end portions 9, are a pair of apertured lugs 10 and 11. Projecting rearwardly from the axle 1, midway between the lugs 10 and 11, is a similar apertured lug 12. Projecting forwardly from the axle 1 are a pair of spaced, forwardly converging brackets 13, to the forward ends of which is connected a draw ring 14.

The rear axle 2, better shown in Figure 3, is in the form of an elongated block of slightly greater length than the front axle 1, and formed with enlarged end portions 15, which project upwardly from the upper face of the main body portion of the axle, and through which the shanks of the rear supporting wheels extend. Between the enlarged end portions 15, the rear axle 2 is provided with a series of spaced, upwardly projecting bosses respectively designated by the numerals 16, 17, 18 and 19.

The construction of the side frame members 3 is better shown in Figure 4 and each consists of an elongated rod 20 formed at its forward end with a bifurcated head 21, the forks of which extend above and below the axle 1, adjacent one of the enlarged end portions 9, and are secured thereto by means of a suitable bolt 22 which passes through the forks of the head 21 and through the axle 1. The rod 20 is formed at its rearward end with a bifurcated head 23, the upper fork 24 of which extends across and is seated on the rear axle 2 adjacent one of the enlarged end portions 15, and the lower fork 25 of which extends beneath the axle 2 in spaced relation thereto. Connected with the head 23 is a bifurcated lug 26 which projects rearwardly from the axle 2. The lug 26 is formed with an upper fork 27 which seats on the fork 24, and with a lower fork 28 which is interposed between the lower face of the axle 2 and the upper face of the fork 25. The forks of the head 23 and lug 26 are connected to each other and to the axle 2 by means of suitable bolts 29.

Having its forward end pivotally connected with the lug 10, by means of a pair of spaced brackets 30, is a beam 31 which extends rearwardly above the rear axle 2, and the downwardly curved rearward end of which is provided with a turner member 32 which is pitched toward the right. The beam 31 rests on an adjusting screw 33 which is threaded vertically through the axle 2 between the bosses 18 and 19. By manipulation of the screw 33, the height of the beam 31 may be varied as desired in order to regulate the depth of cut of the turner member 32.

Having its forward end pivotally connected with the lug 11 is a similar beam 34, the downturned rearward end of which is provided with a turner member 35 which is pitched to the left. The beam 34 extends across the axle 2 and rests on an adjusting screw 36 similar to the screw 33 previously described.

Projecting rearwardly from the rear axle 2 is a bifurcated lug 37, the upper and lower forks 38 and 39 of which respectively extend above and below the boss 18. The upper face of the lug 37 extends rearwardly in continuation of the upper fork 38 and provides a mounting for a plate 40 which is formed with an upwardly extending ratchet member 41.

Seated on the plate 40 is a plate 42 which is formed at its forward end with an upwardly extending ratchet member 43. The upper face of the plate 40 and the lower face of the plate 42 are oppositely recessed to provide for the insertion therebetween of a horizontally disposed end portion 44 of a substantially inverted U-shaped seat support 44'. The rearward ends of the plates 40 and 42 are connected together and to the lug 37 by means of suitable bolts 45, and the forward ends of the plates 40 and 42 are connected by means of a bolt 46 which extends through the plates, the end portion 44 of the seat support, the forks 38 and 39, and the boss 18. The construction of the lug 37, and its arrangement with respect to its associated elements is better shown in Figure 5.

Connected with the boss 17 is a lug 47 which is similar to the lug 37, and upon which is mounted a plate 48 provided with an upwardly extending ratchet member 49. The upper face of the lug 47 and the lower face of the plate 48 are oppositely recessed to provide for the insertion therebetween of the other horizontally disposed end portion 44 of the seat support 44'. Extending through the boss 17, as well as through the forks of the lug 47, plate 48 and end portion 44 of the seat support is a bolt 50 similar to the bolt 46. The lug 47 and its associated elements are better shown in Figure 6. Having its forward end connected with the seat support 44' is an upwardly and rearwardly curved resilient bar 51 which is provided at its rearward end with a seat 52.

Extending beneath the beam 31, transversely thereof, is the central portion 53 of a crank 54, the outer horizontally disposed ends 55 and 56 of which are rotatably mounted in the lug 37 and a lug 26. Spanning the central portion 53 of the crank 54 is the bifurcated rearward end of a link 57, such bifurcated end being maintained in position with respect to the crank by means of a bolt 58'. The forward end of the link 57 is pivotally connected with a lever 58, the lower end of which is mounted on a suitable pivot pin passing through an opening 59 in the ratchet member 41, and which is provided adjacent its lower end with a pawl 60 for engagement with the teeth of the ratchet member 41. Upon movement of the lever 58 in a forward direction the crank 54 is rotated in a manner to lift the beam 31 from its seat upon the adjusting screw 33. Extending beneath the beam 34 is the central portion 61 of a similar crank, the horizontal end portions 62 and 63 of which are pivotally mounted in the lug 47 and one of the lugs 26. Connected with the central portion 61 is a link 64 similar to the link 57, the link 64 being pivotally connected with a lever 65 which is provided with a pawl 66 for engagement with the teeth of the ratchet member 49.

Having its forward end pivotally connected with the lug 12 by means of suitable brackets 67, is a beam 68 which extends rearwardly between the rear axle 2 and the seat support 44', and the down-turned rearward end of which is provided with a buster member 69. The beam 68 is formed with a bifurcated extension 70 which projects rearwardly from the buster member 69, and between the forks of which is supported a vertically disposed plate 71. Pivoted intermediate its ends to the beam 68 is a lever 72, upon the lower end of which is rotatably mounted a ground wheel 73, and the upper end of which is pivotally connected with the rearward end of a link 74, the forward end of which is pivotally connected with a hand lever 75. The lower end of the lever 75 is pivotally connected with the ratchet member 43 and is provided with a pawl to engage the teeth of the latter.

Pivoted to the extension 70 are a pair of upwardly extending handle members 76 which are pivotally connected intermediate their ends with the rearward ends of a pair of links 77, the forward ends of which are pivotally connected to the beam 68. Upon movement of the handle members 76 in an upward direction, or upon movement of the lever 75 in a forward direction, the beam 68 will be lifted from the adjusting screw 79 upon which it is normally seated to lift the buster member 69 into an inoperative position.

It will be readily apparent that the adjusting screws 33, 36 and 79 may be adjusted independently of each other in order to independently regulate the depth of cut of the members 32, 35 and 69. It will also be readily apparent that the rearward ends of the beams 31, 34 and 68 may be further elevated as desired in order to selectively render the members 32, 35 and 69 inoperative. Owing to the swivel mounting of the supporting wheels 4, the entire frame may be pivoted on either of the rearward supporting wheels when it is desired to reverse the direction of movement of the plow.

It is thought that the many advantages of a combination plow in accordance with this invention will be readily apparent, and although the preferred embodiment of the invention is as illustrated and described, it is to be understood that changes in the size, shape and arrangement of parts may be resorted to, so long as such changes fall within the scope of the invention as defined in the appended claims.

What I claim is:

1. In a combination plow, a front and a rear axle, a pair of side members connecting the axles and coacting therewith to provide the frame of the plow, a plurality of supporting beams pivotally connected with the front axle and extending across the rear axle, an earth working element carried by each beam, means for individually adjusting the beams to regulate the depth of cut of the earth working elements independently, and means for independently swinging the beams about their pivots to selectively move the earth working elements into inoperative position.

2. In a combination plow, a front and a rear axle, a supporting wheel swivelly mounted adjacent each end of each axle, a pair of side members connecting the axles and coacting therewith to provide the frame of the plow, a plurality of supporting beams pivotally connected with the front axle and extending across the rear axle, an earth working element carried by each beam, means for individually adjusting the beams to regulate the depth of cut of the earth working elements independently, and means for independently swinging the beams about their pivots to selectively move the earth working elements into inoperative position.

3. In a combination plow, a front and a rear axle, a pair of side members connecting the axles and coacting therewith to provide the frame of the plow, a plurality of supporting beams pivotally connected with the front axle and extending across the rear axle, an earth working element carried by each beam, a plurality of adjusting screws threaded vertically through the rear axle and each supporting one of said beams, and means for independently swinging the beams about their pivots to selectively move the earth working elements into inactive position.

4. In a combination plow, a front and a rear axle, a pair of side members connecting the axles and coacting therewith to provide the frame of the plow, a pair of supporting beams pivotally connected with the front axle adjacent the ends of the latter, said beams extending rearwardly across the rear axle, right and left turner members carried by said beams respectively, a supporting beam pivotally connected to the front axle midway between the ends of the latter, a buster member carried by the last named beam, said buster member being arranged rearwardly of the turner members, means for individually adjusting the beams to regulate the depth of cut of the members carried thereby independently, and means for independently swinging the beams about their pivots to selectively move the members carried thereby into inactive position.

5. In a combination plow, a front and a rear axle, a vertically adjustable supporting wheel swivelly mounted adjacent each end of each axle, a pair of side members connecting the axles and coacting therewith to provide the frame of the plow, a pair of supporting beams pivotally connected with the front axle adjacent the ends of the latter, said beams extending rearwardly across the rear axle, right and left turner members carried by said beams respectively, a supporting beam pivotally connected to the front axle midway between the ends of the latter, a buster member carried by the last named beam, said buster member being arranged rearwardly of the turner members, means for individually adjusting the beams to regulate the depth of cut of the members carried thereby independently, and means for independently swinging the beams about their pivots to selectively move the members carried thereby into inactive position.

6. In a combination plow, a front and a rear axle, a pair of side members connecting the axles and coacting therewith to provide the frame of the plow, a pair of beams pivotally connected with the front axle adjacent the ends of the latter, said beams extending rearwardly across the rear axle, right and left turner members carried by said beams respectively, a beam pivotally connected with the front axle midway between the ends of the latter, a buster member carried by the last named beam, said buster member being arranged rearwardly of the turner members, a plurality of adjusting screws threaded vertically through the rear axle and each supporting one of said beams, and means for independently swinging the beams about their pivots to selectively move the members carried thereby into inactive position.

7. In a combination plow, a front and a rear axle, a pair of side members connecting the axles and coacting therewith to provide the frame of the plow, a pair of supporting beams pivotally connected with the front axle adjacent the ends of the latter, said beams extending rearwardly across the rear axle, right and left turner members carried by said beams respectively, a supporting beam pivotally connected to the front axle midway between the ends of the latter, a buster member carried by the last named beam, said buster member being arranged rearwardly of the turner members, means for individually adjusting the beams to regulate the depth of cut of the members carried thereby independently, a pair of crank shafts having end portions journaled in the rear axle and having central portions extending beneath the supporting beams for the turner members, means for independently operating the crank shafts to selectively lift the turner members into inactive position, and means for independently swinging the supporting beam for the buster member about its pivot to lift the buster member into inactive position.

8. In a combination plow, a front and a rear axle, a vertically adjustable supporting wheel swivelly mounted adjacent each end of each axle, a pair of side members connecting the axles and coacting therewith to provide the frame of the plow, a pair of supporting beams pivotally connected with the front axle adjacent the ends of the latter, said beams extending rearwardly across the rear axle, right and left turner members carried by said beams respectively, a supporting beam pivotally connected to the front axle midway between the ends of the latter, a buster member carried by the last named beam, said buster member being arranged rearwardly of the turner members, means for individually adjusting the beams to regulate the depth of cut of the members carried thereby independently, a pair of crank shafts having end portions journaled in the rear axle and having central portions extending beneath the supporting beams for the turner members, means for independently operating the crank shafts to selectively lift the turner members into inactive position, and means for independently swinging the supporting beam for the buster member about its pivot to lift the buster member into inactive position.

9. In a combination plow, a front and a rear axle, a pair of side members connecting the axles and coacting therewith to provide the frame of the plow, a pair of beams pivotally connected with the front axle adjacent the ends of the latter, said beams extending rearwardly across the rear axle, right and left turner members carried by said beams respectively, a supporting beam pivotally connected with the front axle midway between the ends of the latter, a buster member carried by the last named beam, said buster member being arranged rearwardly of the turner members, a plurality of adjusting screws threaded vertically through the rear axle and each supporting one of the beams, a crank shaft having end portions journaled in the rear axle and having central portions extending beneath the supporting beams for the turner members, means for independently operating the crank shafts to selectively lift the turner members into inactive position, and means for independently swinging the supporting beam for the buster member about its pivot to lift the buster member into inactive position.

10. In a combination plow, a front and a rear axle, a pair of side members connecting the axles and coacting therewith to provide the frame of the plow, a plurality of supporting beams pivotally connected with the front axle and extending across the rear axle, an earth working element carried by each beam, means for individually adjusting the beams to regulate the depth of cut of the earth working elements independently, and means for independently swinging the beams about their pivots to selectively move the earth working elements into inoperative position, each of said side members consisting of a rod formed at its ends with bifurcated heads straddling the axles and further consisting of means for securing said bifurcated heads to the axles.

In testimony whereof I affix my signature hereto.

GEORGE P. LUCIUS.